Figure 1:
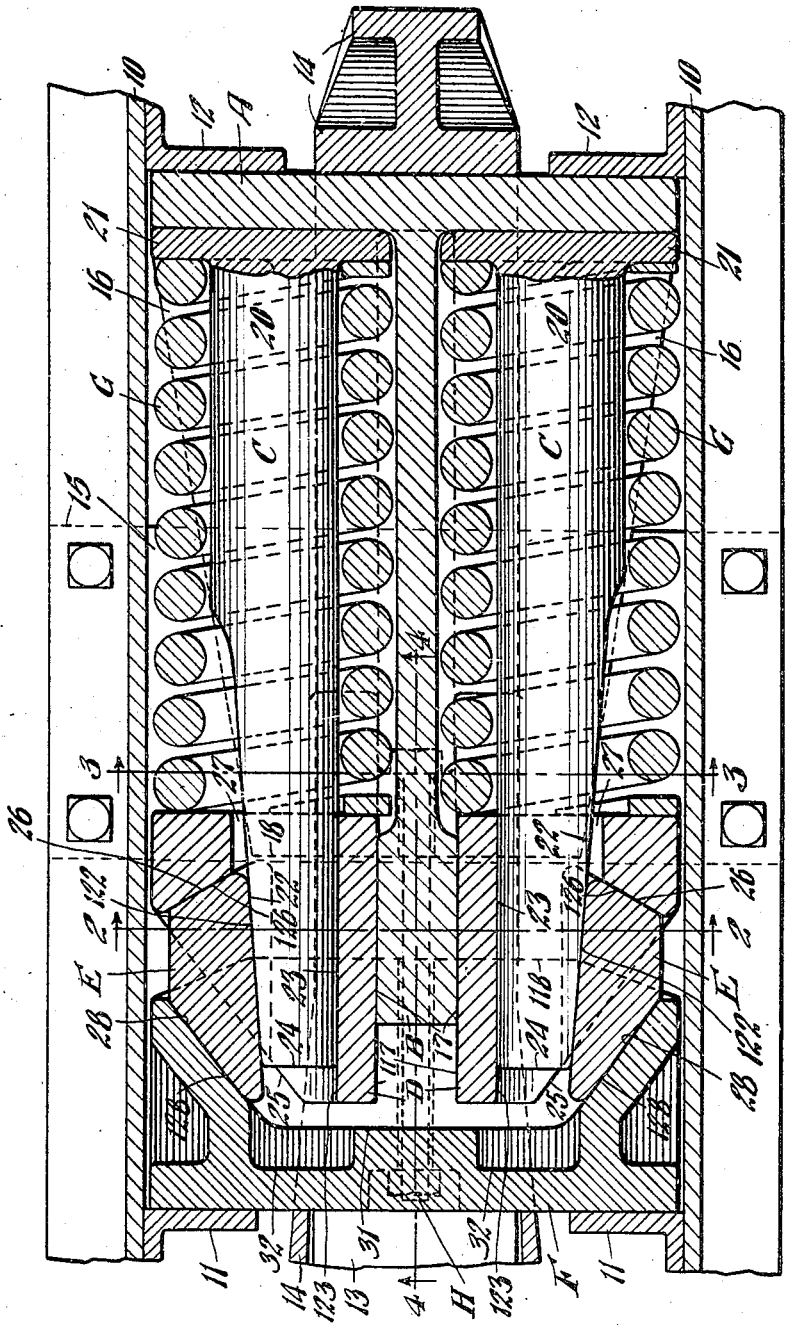

July 10, 1928.

S. B. HASELTINE 1,676,613

FRICTION SHOCK ABSORBING MECHANISM

Filed Aug. 19, 1926  2 Sheets-Sheet 1

Witness
Wm. Geiger

Inventor
Stacy B Haseltine
By George I. Haight
Atty.

July 10, 1928.
S. B. HASELTINE
1,676,613
FRICTION SHOCK ABSORBING MECHANISM
Filed Aug. 19, 1926  2 Sheets-Sheet 2
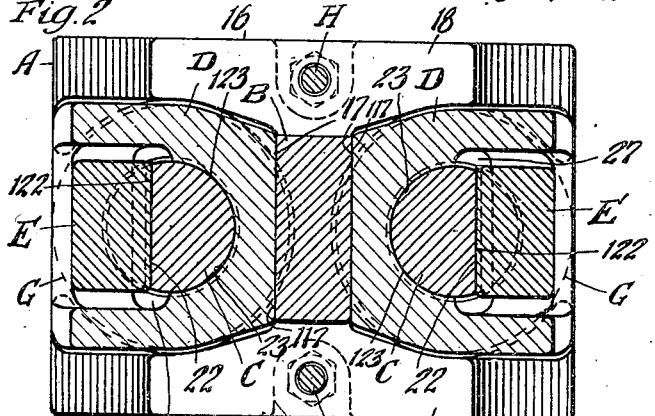
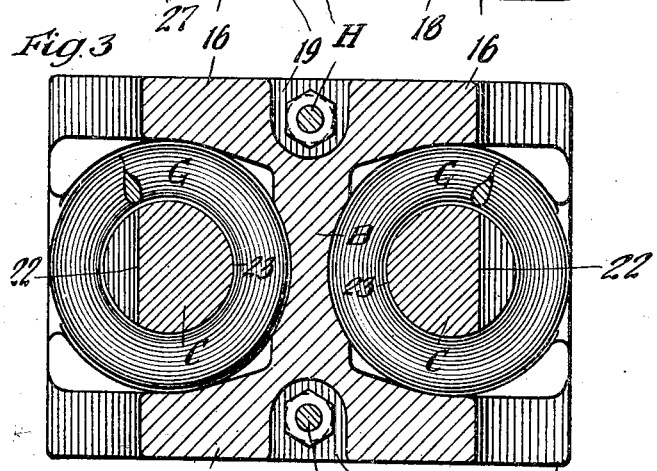
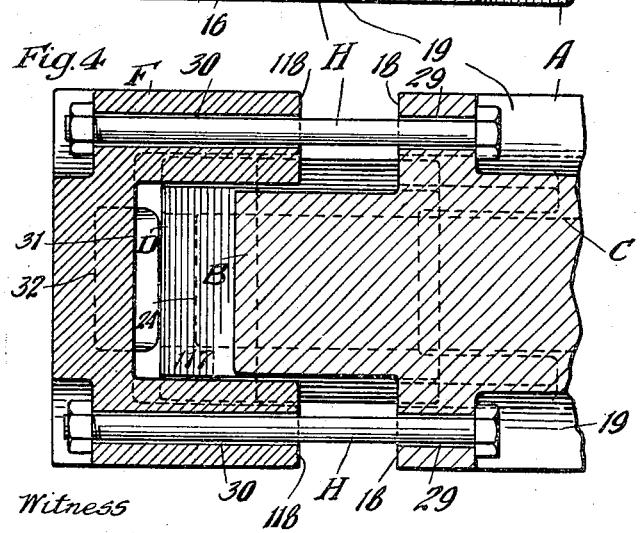
Witness
Wm. Geiger
Inventor
Stacy B. Haseltine
By George I. Haight
Atty.

Patented July 10, 1928.

1,676,613

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed August 19, 1926. Serial No. 130,122.

This invention relates to improvements in friction shock absorbing mechanisms.

One object of the invention is to provide a friction shock absorbing mechanism especially adapted for railway draft riggings, having great column strength, together with high frictional capacity and assured release.

Another object of the invention is to provide a friction shock absorbing mechanism of the character indicated, including a plurality of column elements and relatively movable friction members having co-operating friction surfaces, whereby high frictional capacity, together with great column strength, is obtained.

A more specific object of the invention is to provide a friction shock absorbing mechanism, including a central column element, two side column elements having yieldingly resisted friction elements co-operating therewith, together with wedge pressure transmitting means for forcing the friction elements into intimate contact with the column elements and for effecting relative movement of the parts.

A further object of the invention is to provide a mechanism of the character indicated, including a central friction post and side friction posts together with yieldingly resisted friction elements co-operating with the posts, certain of said friction elements being interposed between the side and central posts, wherein a single wedge pressure transmitting means is employed for forcing all of the friction elements into intimate contact with the post and effecting relative movement of the elements and posts.

Other and further objects and advantages of the invention will more fully and clearly appear from the description and claims hereinafter following.

In the drawings, forming a part of this specification, Figure 1 is a longitudinal, horizontal sectional view of a portion of a railway draft rigging showing my improvements in connection therewith. Figures 2 and 3 are transverse vertical sectional views corresponding respectively to the lines 2—2 and 3—3 of Figure 1. And Figure 4 is a vertical longitudinal sectional view of the forward end portion of the shock absorbing mechanism, corresponding substantially to the line 4—4 of Figure 1.

In said drawings, 10—10 indicate channel-shaped center or draft sills of a railway car underframe, to the inner faces of which are secured front stop lugs 11—11 and rear stop lugs 12—12. The inner end of the drawbar is designated by 13, to which is operatively connected a yoke 14 of well known form. The shock absorbing mechanism proper is disposed within the yoke and the yoke and the parts therewithin are supported in operative position by a detachable saddle plate 14 secured to the draft sills.

My improved shock absorbing mechanism proper comprises, broadly: A rear follower element A; a central friction post B; two side friction posts C—C; two friction members D—D; two friction shoes E—E; a wedge casing F; twin arranged spring resistance elements G—G; and a pair of retainer bolts H.

The rear follower A is in the form of a substantially rectangular plate co-operating with the rear stop lugs 12. The friction post B is formed integral with the follower A and extends forwardly therefrom and is arranged on the longitudinal center line of the mechanism. The friction post is provided with top and bottom flanges 16—16 extending from the rear follower A and terminating inwardly of the front end of the post B, the flanges being formed integral with the post and follower A. As will be seen upon reference to Figures 2 and 3, the friction post presents a substantially H-shaped cross-section. At the forward end, the post B is provided with longitudinally disposed flat friction surfaces 17—17 on the opposite sides thereof. The friction surfaces 17 preferably extend parallel to the longitudinal axis of the mechanism. At the forward end, the top and bottom flanges 16 of the post B present transverse end abutment faces 18—18 for a purpose hereinafter described. As most clearly shown in Figure 1, the opposite sides of the post B rearwardly of the friction surfaces, are cut away to present concave recesses adapted to accommodate the corresponding sides of the spring resistance elements G. The top and bottom flanges are recessed as indicated at 19—19 for a purpose hereinafter described.

The two side friction posts C are of identical design, but reversely arranged. Each of the posts C comprises a cylindrical column section 20 and has a flange 21 at the rear end thereof bearing on the front face of the rear follower A. At the forward end, on the outer side thereof, each post is provided with a flat friction surface 22, the friction surfaces 22 of the two posts converging forwardly of the mechanism. On the inner side, each post presents a longitudinally disposed cylindrical friction surface 23. The front ends of the posts C present flat abutment faces 24 adapted to co-operate with the front follower to limit the inward movement of the latter when the gear is fully compressed.

The two friction members D are disposed on opposite sides of the central friction post B and are of similar design. Each of the friction members D is in the form of a hollow sleeve having a longitudinally disposed flat friction surface 117 on the inner side thereof adapted to cooperate with the friction surface 17 at the same side of the post D. On the outer side, each sleeve is cut away as indicated at 25 to clear the side walls of the casing F. Each sleeve is also provided with an interior relatively blunt wedge face 26 at the inner end thereof, adapted to co-operate with the corresponding friction shoe E. The rear ends of the sleeves D present transverse flat abutment faces adapted to co-operate with the front ends of the spring resistance elements G. Each of the sleeves D is provided with an opening 27 at the inner end thereof adapted to freely accommodate the forward end of the corresponding post C. As shown in Figure 1, there is sufficient clearance between each post C and the side walls of the opening 27 of the corresponding friction member D to permit the necessary inward movement of the sleeve of the member D with respect to the post C without danger of the parts binding on each other. The hollow sleeve-like friction members D are also provided with longitudinally disposed interior concave friction surfaces 123 co-operating with the friction surfaces 23 of the respective posts C.

The two friction shoes E are of similar design, each being in the form of a solid block having flat inner friction surfaces 122 co-operating with the friction surfaces 22 of the posts C. At the forward end, each friction shoe is provided with an outer wedge face 28 adapted to co-operate with the wedge casing F. At the inner end, each shoe has a blunt wedge face 126 correspondingly inclined to the face 26 on the friction member D at the same side of the mechanism, and engaging therewith.

The wedge casing F is in the form of a rectangular box open at the inner end, and having rearwardly diverging interior wedge faces 128—128 on the opposite sides thereof adapted to co-operate respectively with the wedge faces 28 of the two shoes E. The top and bottom walls of the casing F extend inwardly beyond the side walls as most clearly shown in Figure 1, and present transverse flat abutment faces 118 adapted to co-operate respectively with the flat abutment faces 18—18 on the top and bottom flanges 16 of the post B. The front end wall of the casing co-operates with the front stop lugs 11 in the manner of the usual front follower.

The twin arranged spring resistance elements G comprise two relatively heavy coils disposed on opposite sides of the post B, each coil surrounding one of the posts C and having the opposite ends thereof bearing respectively on the inner end of the corresponding friction member D and the flange 21 at the rear end of the post.

The retainer bolts H are two in number, and are disposed at the top and bottom of the mechanism. The bolts H have the heads thereof accommodated within the recesses 19 of the flanges 16 of the post B. The shanks of the bolts extend through aligned openings 29 and 30 in the flanges 16 and the top and bottom walls of the casing F. The nuts of the bolts are accommodated within recesses at the forward end of the casing. The recesses 19 in which the heads of the bolts are accommodated are of sufficient length to permit the necessary movement of the bolts H during the compression stroke of the mechanism. The retainer bolts H hold the mechanism assembled and may be adjusted to obtain the proper overall length. The parts when assembled are so adjusted that the springs G are under an initial compression, whereby compensation for wear of the various friction and wedge faces of the mechanism is had.

The normal full release position of the mechanism is shown in Figure 1. In this position, the front end of the post B, the abutment faces 18 of the flanges of the post, and the front ends of the posts C are spaced a predetermined distance respectively from the inner face 31 of the casing F, the abutment faces 118 on the top and bottom walls of the casing, and the transverse flat abutment faces 32 on the inner side of the end wall of the casing. As shown in Figure 1, the end wall of the casing is recessed on opposite sides to accommodate the front ends of the posts C when the mechanism is fully compressed so that the abutment faces 32 will engage the abutment faces 24 of the posts C simultaneously with engagement of the face 31 of the casing with the front end of the post B and simultaneously with engagement of the abutment faces 118 and 18 of the casing and post B. It will be seen that by providing simultaneous engagement of these abutment faces, great column strength is provided, and the actuating force will be transmitted directly through the column elements or posts B and C to the rear follower and corresponding draft lugs, thereby preventing the springs G from being unduly compressed.

The operation of my improved shock absorbing mechanism, assuming a compression stroke is as follows: The follower A and casing F will be moved relatively toward each other, thereby effecting an inward wedging action on the friction shoes E and forcing the same rearwardly of the mechanism, compressing the springs G. On account of the inter-engaging blunt wedge faces 126 and 26 at the inner ends of the shoes and on the friction members D, any tendency of the shoes to tilt during the wedging action will be overcome. Due to the lateral inward pressure applied on the shoes, the latter will be forced into intimate frictional contact with the friction surfaces of the posts C, and the posts in turn will be forced laterally inwardly, thereby pressing the friction surfaces 23 thereof into intimate contact with the friction surfaces 123 of the friction members D. The latter will be forced laterally also against the friction post B, thereby bringing the co-operating friction surfaces of these parts into intimate contact. During the continued inward movement of the casing F, friction shoes E and friction members D, there will be a slight differential action due to the diverging relation of the outer friction surfaces 22 of the posts C, causing the friction members D to move inwardly at a greater rate than the casing F, thereby effecting additional compression of the spring resistance elements G. It will be evident that as the mechanism is compressed, friction will be created between all of the friction surfaces of the posts and the friction shoes and friction members. This action will continue until the actuating force is reduced or movement of the casing F with respect to the follower A is limited by engagement of the various abutment faces of the casing with the front ends of the friction posts B, C and C, and with the flanges 16 of the post B.

When the actuating force is reduced, the follower casing F will be free to drop away from the friction shoes E, thereby immediately reducing the lateral pressure on the friction shoes E, posts C, friction members D and post B, permitting the spring resistance elements G to expand and restore the parts to normal position. During release of the mechanism, as well as during all the stages of operation of the same, the springs G which bear on the flanges 21 of the posts C will maintain the latter in fixed position longitudinally of the mechanism and hold them in contact with the follower A. As the posts C are free to move laterally on the follower A, no substantial resistance will be offered to their lateral movement during compression of the mechanism.

From the preceding description taken in connection with the drawings, it will be evident that I have provided a gear of exceptional column strength, without any reduction in the spring capacity of the same. By disposing the springs about two outer columns of the gear, an exceedingly compact arrangement of column means and springs is provided.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a plurality of column elements having longitudinally arranged friction surfaces, certain of said column elements having limited lateral movement, said last named column elements having friction surfaces on the outer sides thereof diverging inwardly of the mechanism; of friction members co-operating with said column elements including friction shoes cooperating with said friction surfaces; means for yieldingly opposing relative movement of said members and elements; and means for wedging said friction shoes laterally, inwardly against the friction surfaces of said elements and effecting relative longitudinal movement thereof.

2. In a friction shock absorbing mechanism, the combination with front and rear followers, one of said followers being in the form a plate; of a central column element fixed to said plate and extending longitudinally of the mechanism; of two side column elements bearing on said plate, said side column elements being laterally displaceable, all of said column elements having friction surfaces extending lengthwise of the mechanism; friction members co-operating with said column elements; a wedge pressure transmitting means co-operating with certain of said friction members for forcing all of said members and column elements into intimate contact and moving the members longitudinally of said column elements; and means yieldingly opposing relative movement of said members and column elements.

3. In a friction shock absorbing mechanism, the combination with a central column; of a pair of columns disposed on opposite sides of said central column; spring means disposed on opposite sides of said central column and surrounding each of the columns of said pair; friction elements co-operating with all of said columns, said elements being yieldingly resisted by the spring means; and lateral wedge pressure transmitting means for forcing said friction elements and columns in intimate contact and effecting relative movement of said elements and columns.

4. In a friction shock absorbing mechanism, the combination with a central column having longitudinally extending friction surfaces on opposite sides thereof; of friction members having friction surfaces co-operating with said column surfaces; a pair of columns disposed on opposite sides of said central column, said side columns and friction members having co-operating friction surfaces; friction wedge shoes co-operating with said side columns and having wedging engagement with said friction members; spring resistance means opposing inward movement of said shoes; and lateral inwardly acting wedge pressure transmitting means co-operating with the shoes.

5. In a friction shock absorbing mechanism, the combination with front and rear follower acting members, one of said follower acting members having a central friction post formed integral therewith, said post having longitudinally disposed friction surfaces, and the other follower acting member having interior wedge faces; of columns disposed on opposite sides of said central post, said columns having inner and outer friction surfaces, said outer friction surfaces diverging inwardly of the mechanism; friction members interposed between said side columns and the central post and co-operating with the friction surfaces thereof, said friction members being longitudinally movable with respect to said columns; a spring resistance means opposing longitudinal movement of said friction members; friction shoes having engagement with the wedge faces of the second named follower acting member and frictional engagement with the outer surface of said columns.

6. In a friction shock absorbing mechanism, the combination with front and rear follower acting members, one of said follower acting members having a column element movable therewith, and the other follower acting member having interior wedge faces; a pair of friction wedge shoes having engagement with the wedge faces of said last named follower acting member; a pair of friction posts having frictional engagement with said shoes and disposed on opposite sides of said central column; friction members interposed between said central column and posts; abutment means on said friction members engaging the inner ends of the friction shoes; and spring means interposed between the follower having the column element movable therewith and the friction members.

7. In a friction shock absorbing mechanism, the combination with a plurality of friction posts; wedege friction shoes co-operating with certain of said posts; friction members interposed between said last named posts and the remaining post; a wedge member co-operating with said shoes, said wedge member engaging the outer ends of all of said posts when the mechanism is fully compressed, whereby said posts act as a solid column load transmitting means to transmit the actuating force to the draft sills when the mechanism is fully compressed; and spring means opposing relative movement of said posts and friction members.

8. In a friction shock absorbing mechanism, the combination with a central column provided with top and bottom flanges; additional columns disposed on opposite sides of said central column; a follower element formed integral with said central column; friction elements co-operating with said columns; spring means opposing movement of said friction elements and holding said additional columns in abutting relation with said follower element; a follower acting member movable with respect to said follower element and having means thereon for forcing said friction elements and columns into intimate contact and moving the same longitudinally with reference to each other; abutment means on said column flanges and follower acting member for limiting relative movement of the latter and follower element when the mechanism has been fully compressed, whereby the actuating force is transmitted directly through said columns to the follower element.

9. In a friction shock absorbing mechanism, the combination with a pair of relatively movable followers, one of said followers having a friction post thereon, said post having longitudinally disposed friction surfaces on the opposite sides thereof; of a pair of friction members co-operating with the friction surfaces of said post; spring means opposing relative movement of said post and friction members; a pair of friction posts on opposite sides of said central post, said last named posts and friction members having inter-engaging longitudinally disposed cylindrical friction surfaces; a pair of friction shoes co-operating with said side posts, said shoes and posts having longitudinally disposed flat co-operating friction surfaces; abutment means on said friction members co-operating with said friction shoes; and follower acting means relatively movable to said posts and having wedging engagement with the shoes.

10. In a friction shock absorbing mechanism, the combination with a central friction element; of follower acting means movable with respect to said element, said follower acting means having inwardly acting wedge faces thereon; friction shoes co-operating with said follower acting means; a pair of friction posts disposed on opposite sides of said central friction element, said posts and shoes having co-operating friction surfaces, the friction surfaces of said posts diverging inwardly of the mechanism; friction members interposed between the posts and central friction element, said friction members and friction shoes having co-operating abutment faces; and spring means disposed on opposite sides of the central friction element, said spring means resisting relative movement of the friction members and friction element and posts.

11. In a friction shock absorbing mechanism, the combination with front and rear follower acting means, one of said means having a central friction element thereon, said friction element having longitudinally disposed friction surfaces on opposite sides thereof, the other follower acting means having interior wedge faces; of friction shoes co-operating with the wedge faces of said follower acting means; a pair of friction posts having frictional engagement with said shoes, said posts being disposed on opposite sides of the central friction element; a pair of friction members having frictional engagement with said central friction element and said posts; and twin arranged spring resistance elements disposed on opposite sides of said friction element, each of said spring resistance elements surrounding the friction post at the same side of the mechanism and resisting relative movement of said post and the co-operating friction member.

12. In a friction shock absorbing mechanism, the combination with a pair of relatively movable followers, one of said followers having a friction post fixed thereto, and the other follower having inwardly acting wedge faces thereon; a pair of side friction posts disposed on opposite sides of said first named friction post; friction elements co-operating with all of said posts, certain of said friction elements having wedging engagement with the wedge faces of the follower acting means; and spring means co-operating with each of said side posts for holding the same in contact with one of said followers, said spring means also opposing relative movement of the posts and friction elements.

13. In a friction shock absorbing mechanism, the combination with a follower acting element carrying a plurality of friction posts; of a second follower acting element movable relatively to said first named follower acting element and having inwardly acting wedge faces thereon; a plurality of friction elements, said friction elements and posts having co-operating friction surfaces, certain of said friction elements being disposed between said posts, and the remaining friction elements having wedging engagement with the wedge faces of the follower acting element, certain of said co-operating friction surfaces being inclined with respect to the longitudinal axis of the mechanism, thereby effecting a differential action; and spring means opposing relative movement of said posts and friction elements.

In witness that I claim the foregoing I have hereunto subscribed my name this 16th day of August, 1926.

STACY B. HASELTINE.